United States Patent Office 2,908,300
Patented Oct. 13, 1959

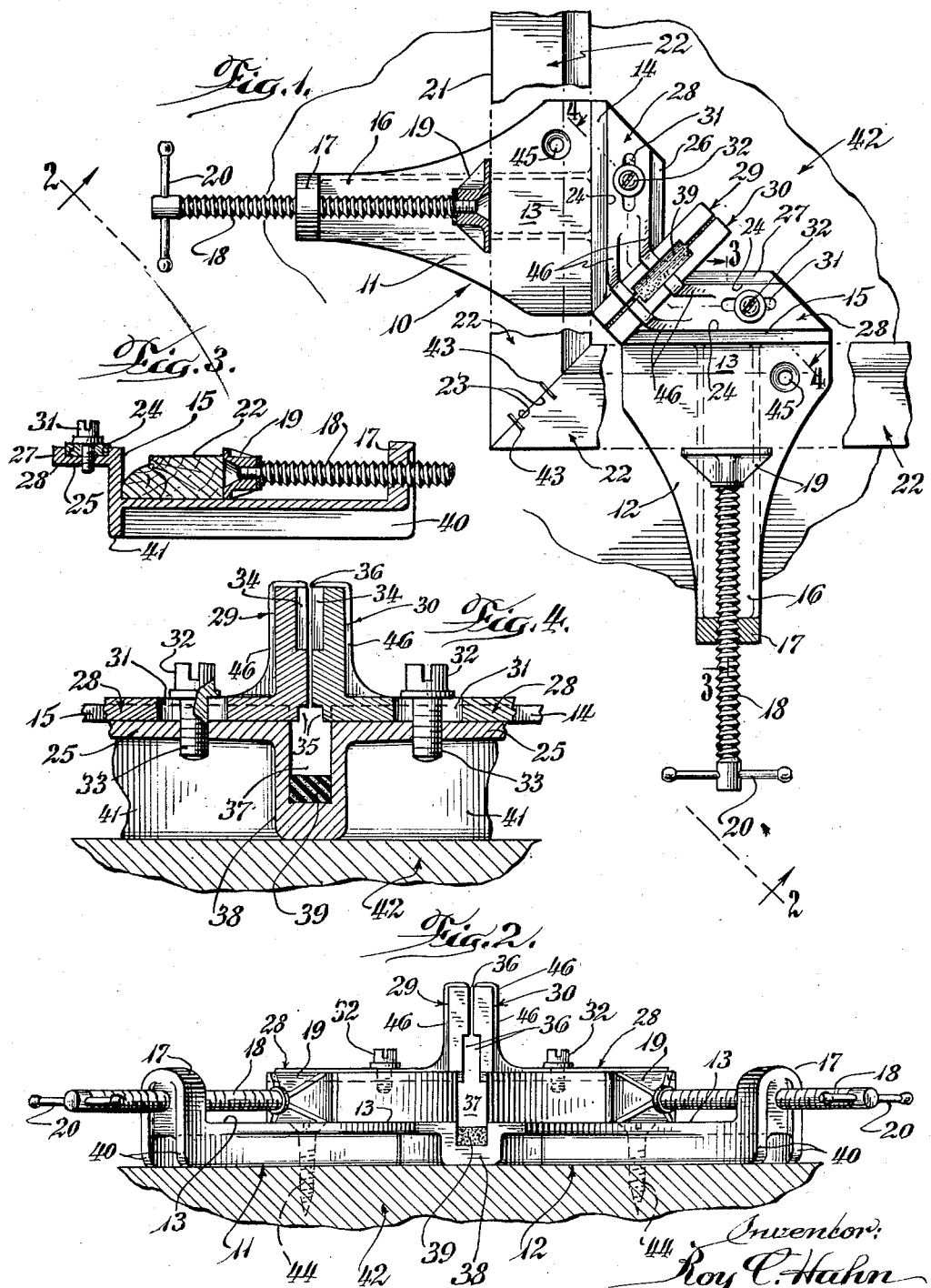

2,908,300
COMBINED MITER BOX AND CORNER CLAMP
Roy C. Hahn, Franklin Park, Ill.
Application April 25, 1958, Serial No. 730,916
4 Claims. (Cl. 143—86)

The present invention relates to a combined miter box and corner clamp for receiving and retaining frame members to be cut at a right or left 45° angle, and when adjoining mitered frame sections have been cut and made ready for joining their mitered ends, these sections are retained securely for ready attachment at a 90° angle. Such frame members are particularly suitable for use in forming picture frames, frames for screens or trim for other purposes.

Among the objects of the present invention is the provision of a novel combined miter box and corner clamp provided with adjustable guides for receiving a saw blade for cutting a clamped frame section or trim at a right or left 45° angle while such section is securely held, and then securely and accurately retaining the mitered and abutting ends of adjoining sections at 90° angle while they are joined together.

The present device is so constructed and arranged that when a section of frame or trim is held by one of the clamps in position to be cut at a right or left 45° angle, a saw position in the saw guides must necessarily and accurately cut the frame section or trim at a precise 45° angle so that when the mitered or butted ends of two sections are clamped in abutting relation the operator is assured these ends will be in continuous contact and accurately placed and when joined together arranged at a precise 90° angle.

The novel saw guides are so designed and relieved in such manner that the saw is maintained at an angle of 45° relative to the frame section to be cut and the cutting edge of the saw is prevented from being damaged as it is manipulated between the guides. In addition, these guides are adjustable to accommodate saw blades of different thicknesses but in all positions of adjustment the saw guides are always maintained at the precise 45° angle for accurately joining abutting sections at a 90° angle.

The present invention further comprehends the provision of a novel miter box and corner clamp capable of being mounted in elevated position upon a supporting surface, such as a bench, table or the like, with complete access above and below the abutting mitered ends of the abutting sections to be joined, and having means for securely anchoring and retaining the device in rigid position upon the supporting surface.

Further objects are to provide a construction of maximum simplicity, efficiency, economy and ease of assembly and operation, and such further objects, advantages and capabilities as will later more fully appear and are inherently possessed thereby.

In the drawing:
Figure 1 is a top plan view of the novel combined miter box and corner clamp.
Fig. 2 is a view in front elevation taken along the line 2—2 of Fig. 1 and viewed in the direction of the arrows.
Fig. 3 is a fragmentary view in vertical cross section taken on the line 3—3 of Fig. 1 and viewed in the direction of the arrows.
Fig. 4 is a fragmentary enlarged view in vertical cross-section taken on the line 4—4 of Fig. 1 and viewed in the direction of the arrows.

Referring to the disclosure in the drawing and more particularly to the novel illustrative embodiment therein shown, the present combined miter box and corner clamp comprises a rigid support or frame 10 of metal or other material suitable for the purpose and provided with spaced arms or projections 11 and 12 disposed at an angle of 90° to each other, with each projection of substantially triangular shape with a relatively wide and flat base 13 merging into spaced and angularly arranged uprights or shoulders 14 and 15 projecting vertically above the flat upper surface of the support 10 and each projection narrowing at its outer end to a relatively narrow ledge 16 provided adjacent its outer end with an upwardly projecting and internally threaded lug 17 for receiving a threaded adjusting screw 18.

Each adjusting screw 18 is provided at its inner clamping end with a wide clamping jaw 19 freely swivelled on the inner end of the screw 18, the outer end of which screw 18 beyond the lug 17 having a transverse pin 20 projecting therethrough and forming a handle for rotating the screw and longitudinally moving its clamping jaw 19. Each clamping jaw is adapted to be moved into engagement with the adjacent longitudinal edge 21 of a frame section or length of trim 22 whereby the section 22 may be securely held between a clamping jaw 19 and a shoulder 14 or 15 on the support, and may be cut to provide a mitered end 23 while so retained. When adjoining frame sections 22 are to be joined, the mitered or abutting ends 23 thereof are brought into continuous surface contact and locked in that position by the clamping jaws as shown in Fig. 1, after which these complementary ends may be accurately and securely joined together with the frame sections 22 disposed at an angle of 90°.

The support 10 at the rear of each shoulder 14 and 15 is provided with a longitudinal slot or channel 24 in a ledge 25 with each slot defined by a shoulder 14 or 15 and a flange 26 or 27. In each slot is slidably mounted an angularly projecting leg or arm 28 of a saw guide 29 and 30. This leg 28 of each of these complementary saw guides is provided with a longitudinally extending elongated slot 31 to receive a set or clamping screw 32, the shank 33 of which is threaded into the ledge 25. This permits each saw guide to be adjusted relative to each other but always disposed in parallel planes and at an angle of 45° with respect to the shoulders 14 and 15 and the frame sections to be cut.

Each saw guide 29 and 30 is centrally relieved at 34 adjacent its upper end and also relieved at 35 adjacent its lower end and these saw guides spaced apart to receive a saw blade (not shown) disposed in the longitudinal slot 36 therebetween. These saw guides are arranged above a relatively wide channel 37 in a part 38 depending from the base of the support 10. In the lower end of this channel 37 is disposed a strip of a resilient material 39 preferably formed of natural or compounded synthetic rubber and adapted to provide an abutment against which the cutting edge of the saw may contact when the mitered ends are being formed.

The undersurface of the support 10 is provided with spaced elevating ribs 40 extending longitudinally beneath each of the arms 11 and 12 and ribs 41, normal to the ribs 40. The lower surface of these ribs 40 and 41 and the undersurface of the channelled part 38 are in alignment and elevate the combined miter box and corner clamp above a bench or other supporting surface 42 whereby to support in elevated positon the frame sections 22 being operated upon. This is particularly important when the abutting mitered ends 23 of adjoining sections are being stapled at 43 as shown in Fig. 1, or when glued or otherwise joined together. To facilitate such joining complete access is available both below and above these mitered ends.

If desired, the combined miter box and corner clamp may be anchored to the bench or other supporting surface 42 by attaching means, such as screws 44, anchored in a countersunk opening 45 in each arm 11 and 12.

By the disclosed arrangement and spacing of the projections 11 and 12, a saw blade inserted and operated between the saw guides 29 and 30 is maintained out of contact with the support 10 and its cutting edge free to operate in the channel 37 in the depending part 38. Also by relieving the saw guides 29 and 30 at 34 and 35, a saw blade in the slot or space 36 between the saw guides is maintained at all times in proper position and relieved of much of the frictional contact inherent in the operation of prior miter boxes.

To reenforce these saw guides, spaced strengthening ribs 46 extend from the leg 28 of each saw guide up and over 29 and 30 in the manner shown.

Having thus disclosed the invention, I claim:

1. A combined miter box and corner clamp comprising a support having projections spaced apart at an angle of 90° and each provided with a threaded lug, an adjusting screw threaded into each lug, a clamping jaw on each adjusting screw, a handle on the outer end of the adjusting screw for adjusting the screw and clamping jaw, a shoulder on said support at the inner end of each of said projections with said shoulders disposed relative to each other at an angle of 90° and disposed opposite to its clamping jaw with the adjacent ends of said shoulders spaced apart, a channeled ledge on and extending adjacent to and along the rear of each of said shoulders and a saw guide adjustably mounted in each channeled ledge.

2. A combined miter box and corner clamp as set forth in claim 1, in which each of said saw guides is relieved to facilitate operation of a saw blade between said guides.

3. A combined miter box and corner clamp as set forth in claim 1, in which said support has a depending channelled part extending below the upper surface of said projections for receiving the cutting edge of a saw when projected through said saw guides.

4. A combined miter box and corner clamp as set forth in claim 1, in which said support has a depending channeled part for receiving the cutting edge of a saw operating between said saw guides, and a resilient protective strip in the base of said channelled part against which the cutting edge of the saw blade abuts when projected through said saw guides.

References Cited in the file of this patent

UNITED STATES PATENTS

| | | |
|---|---|---|
| 2,266,507 | Neumann et al. | Dec. 16, 1941 |

FOREIGN PATENTS

| | | |
|---|---|---|
| 17,239 | Great Britain | Sept. 27, 1892 |
| 28,191 | Great Britain | Nov. 30, 1897 |